Jan. 9, 1934. M. W. MARIEN 1,942,968
EXPANDER FOR PISTON RINGS
Filed Jan. 26, 1933
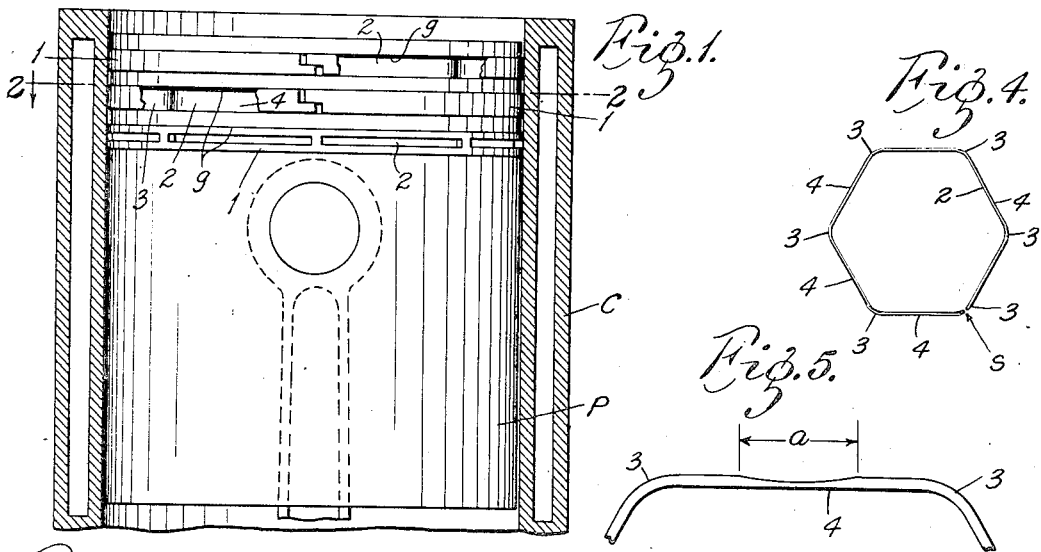
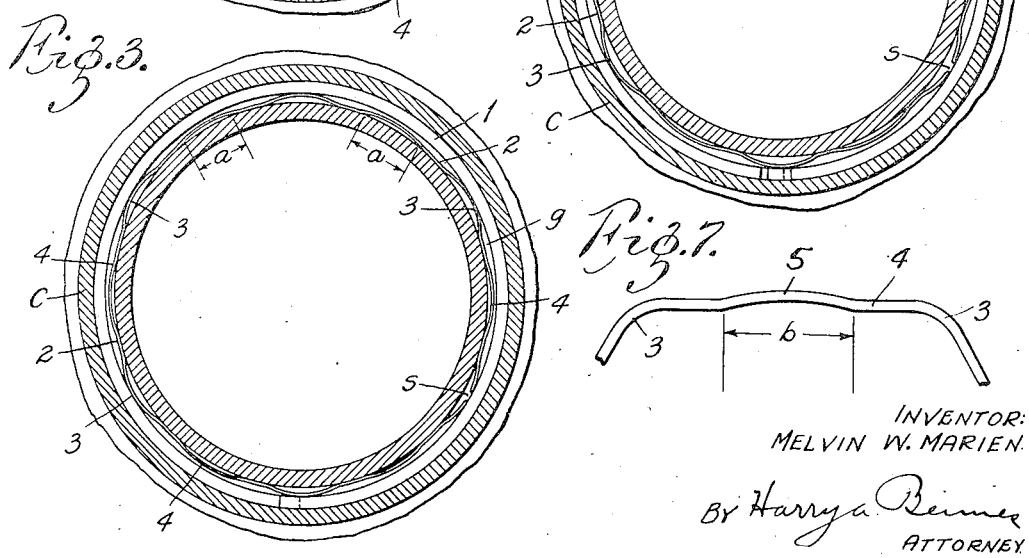
INVENTOR:
MELVIN W. MARIEN
By Harry A. Benner
ATTORNEY Patented Jan. 9, 1934

1,942,968

UNITED STATES PATENT OFFICE 1,942,968

EXPANDER FOR PISTON RINGS

Melvin W. Marien, St. Louis, Mo., assignor to Ramsey Accessories Manufacturing Corporation, St. Louis, Mo., a corporation of Missouri Application January 26, 1933. Serial No. 653,637

3 Claims. (Cl. 309—43)

My invention has relation to improvements in piston packing rings for internal combustion engines, and it consists in the novel features of construction more fully set forth in the specification and pointed out in the claims.

The invention is directed more particularly to compound piston rings embodying an outer split packing ring and an inner tension ring, or expander, the expander being so constructed that it will perform its function of assisting the outer ring to remain at all times in intimate contact with the cylinder wall without introducing internal friction in the ring combination.

It is, therefore, the principal object of the present invention to provide an expander that will not slide circumferentially in the piston ring groove as both it and the outer ring expand and contract as they move back and forth over the cylinder wall. This object I accomplish by reducing the tension of the expander between the parts thereof that contact with both the piston and the outer piston ring so that it will buckle at these points and thereby take up the slack introduced into the expander by the contraction thereof rather than take up this slack by a circumferential movement of the expander. This object, as well as other advantages inherent in the invention, will be better understood from a detailed description thereof in connection with the accompanying drawing, in which:

Figure 1 is a side elevation of a piston provided with piston rings and expanders embodying my improved features, parts of the outer rings being broken away to expose the expanders; Fig. 2 is a horizontal cross-section taken through one of the grooves of the piston as indicated by the line 2—2 in Fig. 1; Fig. 3 is a cross-sectional view similar to Fig. 2 except that the ring and expander are contracted in Fig. 3 while they are expanded in Fig. 2; Fig. 4 is a plan view of an expander on a reduced scale to show its preferable polygonal shape; Fig. 5 is an enlarged view of a fragment of the expander showing how the side thereof is deformed by reducing its thickness along the medial portion of said side; Fig. 6 is a cross-section similar to Fig. 2 showing a modification of the expander in which the sides are deformed by crimping the medial portion outwardly instead of reducing it in thickness; and Fig. 7 is an enlarged fragment of the modified form of expander shown in Fig. 6.

Referring to the drawing, C indicates an engine cylinder, and P the piston operable therein which is provided with grooves g, g, g to receive packing rings 1, 1, 1. The packing rings 1, 1, 1 have inner spring rings, or expanders, 2 disposed behind them in their respective grooves g, which expanders form the specific subject-matter of this application. The expanders, of course, are split, as shown at s (as are the rings 1, as is generally known), and are made of a flat ribbon of steel, and the split, or gap, s is preferably located at one of the corners 3 of the polygon.

When a polygonal expander, such as herein shown, is inserted into the groove g of a piston (as shown in Fig. 2) it assumes a generally circular shape with its side 4 hugging the bottom of the piston groove and its corners 3 bearing against the inner surface of the piston ring 1. The distortion of the expander in this manner obviously exerts an outward tension on the ring 1 at the points contacted by the corners 3 of the expander. Now, when the piston ring 1 is contracted by moving into a smaller part of the cylinder C it is quite obvious (in the case of the ordinary expander) that the space in which the expander is confined is shortened circumferentially and the expander must likewise be shortened circumferentially. The gap s permits of the expander being shortened under this action and allows the ends adjacent the gap to move toward each other as the expander slides around in the groove on both sides of said gap. Obviously, the sliding of the expander as it is contracted during the operation of the piston introduces considerable internal friction in the ring combination and places a certain drag on the piston, decreases and cuts down the effective power of the motor.

I have succeeded in overcoming the internal friction just referred to by deforming the sides 4 of the expander 2 so that when the stresses due to the contraction of the ring 1 are imposed on the corners 3 of the expander, said sides 4 will buckle outwardly under such stresses instead of the expander sliding in the groove as above set forth. One method of deforming the expander sides 4 is to reduce the thickness of the sides along a medial portion thereof, as indicated by the dimension a in Figs. 2 and 5. The reducing of the thickness of the expander side of course decreases the stiffness of such part of each side, and as the expander is contracted, as shown in Fig. 3, the sides will buckle outwardly and the slack in the expander will be taken up by this buckling rather than by the sliding of the expander to close the gap s, and the friction introduced by the sliding of the expander is thereby eliminated. It is quite apparent that the sides of the expander are weakened through this reduction in their thickness, but this weakening is immaterial insofar as the action of the expander is concerned because the spring action of the expander on the outer ring is obtained by the flattening of the corners 3. In other words, it is the corners 3 of the expander that impose the tension on the outer ring 1, the sides 4 of the expander merely serving as connectors for the corners. In fact, the weakening of the sides of the expander increases the expander's alertness or responsiveness to the changes in the diameter of the piston ring as the action of the spring corners 3 is not impeded or retarded by the inertia and friction of the sides. The spring corners 3 act more nearly as they would if they were entirely disconnected so that the expander would consist of a plurality of independent spaced springs.

Instead of reducing the thickness of a part of each side of the expander 2, the same result may be obtained by crimping the side outwardly, or buckling the side permanently to a slight extent to form outwardly bowed portions 5, as shown in Figs. 6 and 7, before the expander is inserted in the piston ring groove. If the sides 4 of the expander are so crimped over an intermediate portion, indicated by the dimension b (Figs. 6 and 7), and then inserted in the piston ring groove they will buckle outwardly as the expander is contracted by the pressure exerted on it by the contracting piston ring 1.

That these results will actually take place and internal friction in the ring combination practically eliminated have been verified by me in actual tests.

It is quite possible that a skilled mechanic may devise other means of causing the same action to take place in the expander than those I have described without departing from the spirit of the invention which broadly contemplates any device that will cause the expander side to buckle under pressure in contradistinction to sliding in the piston groove.

Having described my invention, I claim:

1. An expander for piston rings comprising a ribbon of spring metal of substantially uniform width throughout its length formed in a polygonal shape, some of the sides of which have means to cause them to spring outwardly when external pressure is applied to the expander.

2. An expander of polygonal shape having substantially straight sides connected by arcuate corners, some of said straight sides having formed therein outwardly bowed portions.

3. An expander of polygonal shape having substantially straight sides connected by arcuate portions, each of said sides having formed in it an outwardly bowed portion.

MELVIN W. MARIEN.